Patented Nov. 23, 1948

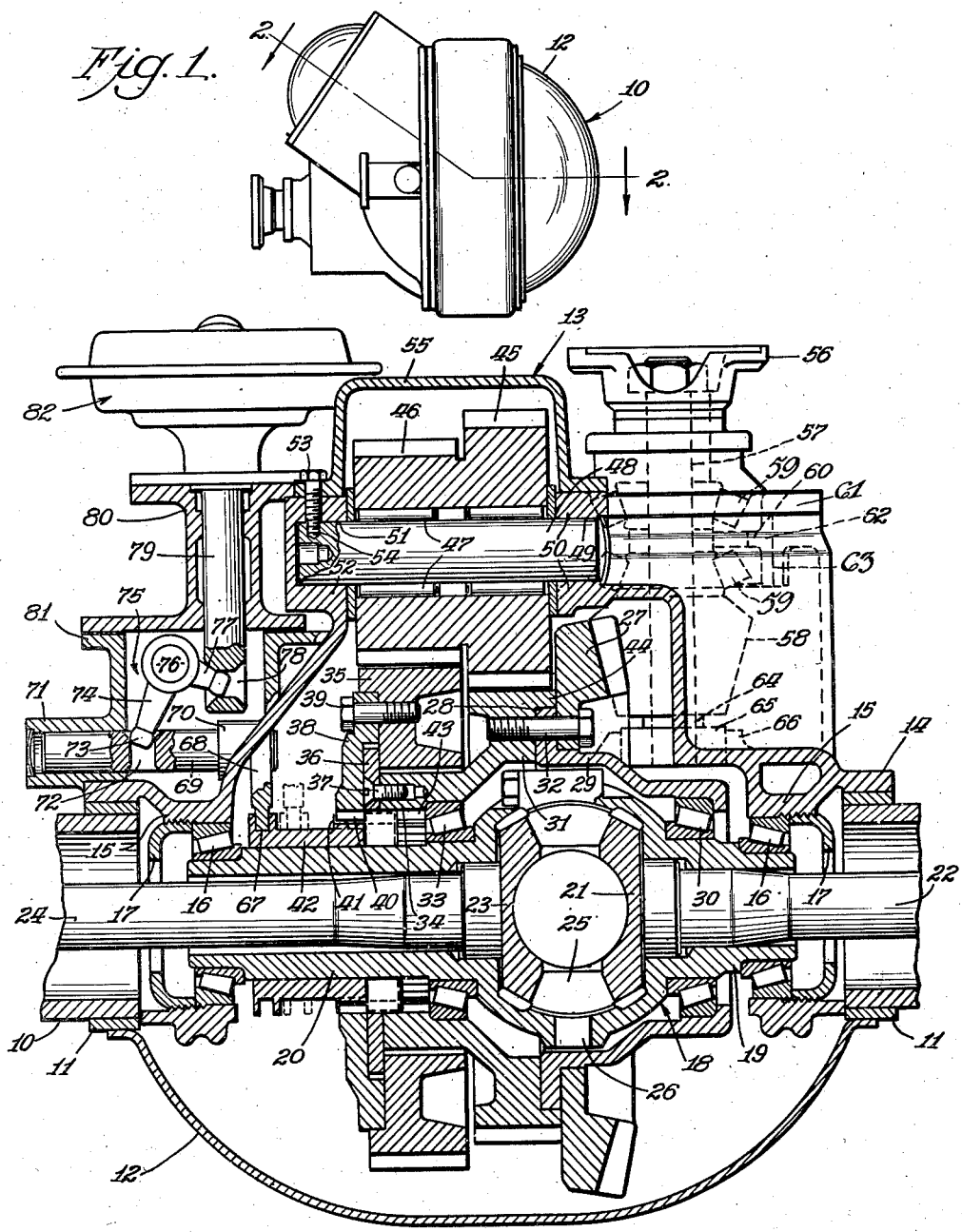

2,454,685

UNITED STATES PATENT OFFICE 2,454,685

DRIVE AXLE FOR VEHICLES

Frank W. Avila, Columbia City, Ind., assignor to International Harvester Company, a corporation of New Jersey Application September 28, 1946, Serial No. 700,046

6 Claims. (Cl. 74—327)

This invention relates to a dual ratio or two-speed mechanism of the type associated with a drive axle assembly of motor driven vehicles. In the construction of final drive mechanisms for automotive vehicles, particularly trucks, it has been found desirable to embody a dual ratio mechanism in or associated with the rear axle construction. Various devices for this purpose have been constructed and are now in general use on trucks as well as on passenger cars.

A principal object of the present invention is to devise a simple, compact and durable two-speed power transmission mechanism to be associated with a differential mechanism of an axle drive structure as a unitary device.

A more specific object is to provide a dual ratio mechanism utilizing a final bevel gear structure independent of the differential mechanism and interposing a simple two-speed spur drive mechanism between the differential and the bevel gear.

Another specific object is to provide a simplified shift mechanism for directly engaging an independently mounted bevel gear with a differential carrier and for shifting to a modified drive mechanism functionally associated with said parts.

The above objects and others, which will be apparent from the detailed description to follow, are accomplished by a construction such as shown in the drawings, in which:

Figure 1 is an end view of a rear axle structure embodying the invention with the axle housing at one side broken away and shown in section; and Figure 2 is a section taken substantially on the line 2—2 of Figure 1.

In the drawings, a banjo axle housing 10 of conventional construction is illustrated, said housing having reinforced rings 11 at both sides of the banjo portion. At the rear a generally semi-circular cover plate 12 is attached to the ring 11. At the front a gear housing designated in its entirety by the reference character 13 is secured to the banjo housing in contact with the ring 11 at that side by means of an annular flange 14. The housing 13 is provided at each end of the banjo portion of the housing 10 and projecting within and across said housing 10 with annular carrier structures 15. Said carrier structures support tapered roller bearing assemblies 16 which are adjustably held by threaded annular retainers 17. This supporting and adjusting construction for differential carriers is conventional and is in wide use at the present time. The differential carrier designated in its entirety by the reference character 18 is formed of two sections, a short section 19 and a long section 20. These sections are supported at their outside ends by the bearing assemblies 16 and are joined at their inner ends to form a compartment for the differential gear mechanism. Said differential gear mechanism includes a gear 21 on an axle drive shaft 22, and a gear 23 on an axle drive shaft 24; also, bevel gears 25 mounted on stub shafts 26 which are rigidly clamped in position by the two sections of the differential carrier. This gear constitutes a differential case or mechanism.

A final drive hypoid gear 27 is secured against a flange 28 integrally formed on one section 29 of an auxiliary carrier structure. Said section is supported by a tapered bearing assembly 30 mounted on the short section of the differential carrier between the enlarged portion thereof and the bearing assembly 16 which supports the outer end of said differential carrier section on the housing structure 13. A second section 31 of the auxiliary carrier structure is secured against the flange 28 by cap-screws 32 which also secure the drive gear 27 to said auxiliary structure. The section 31 is supported on a tapered roller bearing 33 which is supported on the long section 20 of the differential carrier adjacent the enlarged portion thereof. The section 31 is also provided with an annular extension 34 projecting beyond the bearing assembly 33. Said extension serves as a journal for a spur gear 35 which is held in position on the extension or sleeve 34 by means of an annular retainer 36 which is secured by recessed cap-screws 37 to the outer end of the extension 34. An annular member 38 secured by cap-screws 39 to the gear 35 overlaps the retainer 36 and is provided with internal teeth 40 which in effect provide one member of a dental-type clutch. A cooperating dental clutch member is provided by teeth 41 formed on a sleeve 42 which is splined on the long section 20 of the differential carrier for rotation therewith and for movement in an axial direction therealong. It will be understood that, as shown in the drawings, the sleeve 42 is in a position to lock the differential carrier section 20 to the member 38 and the gear 35 for rotation therewith. The dotted lines indicate a neutral position in which no power is transmitted to the differential carrier structure.

The sleeve 42 is also shiftable to the right, as viewed in Figure 2, so that the teeth 40 may be engaged with teeth 43 formed on the extension 34 to provide in effect a dental clutch member thereon. When the member 42 is shifted to engage the teeth 43, the differential carrier 18 is locked to the structure which carries the hypoid drive gear 27 and the structure functions as a unitary structure, the drive being direct.

The section 31 of the auxiliary carrier structure is formed with an integral gear extension 44 abutting the back of the hypoid gear 27. The teeth of said gear extension are engageable with the teeth of a gear 45 formed integrally as a cluster with a gear 46 in mesh with the gear 35. Said cluster is carried by roller bearing assemblies 47 on a short shaft 48 which extends into a bore 49 formed in an annular supporting structure 50 which is an integral part of the housing 13. The other end of the shaft 48 is non-rotatably supported in a bore 51 carried in an annular supporting structure 52, also an integral part of the housing 13. A cap-screw 53 extends through an opening in the supporting structure 52 and into a bore 54 formed in the shaft 48 to secure it against rotation and against movement in an axial direction. A cover plate 55, arched to clear the gears 45 and 46, is provided to cover an opening formed in the housing 13 of sufficient size, as illustrated in Figure 1, to permit the insertion and withdrawal of the gear cluster.

By means of a conventional propeller shaft utilizing any type of flexible joint, not shown, power is applied to a coupling member 56 splined on a pinion shaft 57. The pinion shaft 57 carries a hypoid gear 58 which meshes with the gear 27 as previously described. A pair of tapered bearing assemblies 59 abutting opposite sides of a web 60 support the pinion shaft 57 intermediate its ends. The web 60 is carried by a supporting structure 61 which has a cylindrical portion 62 fitting in a bore 63 formed in the housing 13. This is conventional construction and is only shown at one side of the pinion carrier in order to show the gear cluster supporting structure which overlaps the pinion in the view shown in Figure 2. The pinion shaft 57 is formed with an extension 64 beyond the hypoid gear 58 which is supported by a bearing assembly 65 carried by an extension support 66 formed integrally with the housing 13.

For moving the sleeve 42 axially along its support on the section 20 of the differential carrier, said sleeve is provided with an annular recess 67 adapted to be engaged by an operating member 68 secured to the end of a shaft 69 slidably mounted in a support 70 and a support 71, said supports being formed integrally with the housing 13. The shaft 69 is provided with a recess 72 engaged both by a ball-shaped end portion 73 and a lever 74. Said lever is one arm of a bell-crank member 75 mounted for oscillation on a supporting pin 76. Another member 77 extending from the bell-crank member 75 engages a slot or bore 78 in a shaft 79 supported for oscillation in an auxiliary structure 80 which is secured to an end face portion 81 of the housing 13. The shaft 79 extends into a diaphragm structure 82 of a conventional nature which has not been illustrated in detail. Such diaphragm members utilize vacuum or air pressure for reciprocating a member such as a shaft 79. A manual mechanism may also be used for shifting the shaft 79, such operating structure being optional and not being a part of the present invention.

The operation of applicant's improved dual ratio rear axle drive structure has been explained in connection with the description of the component parts. By supporting the auxiliary carrier structure for the final drive gear on the differential carrier structure, as shown in the described embodiment of applicant's invention, and by supporting the large spur gear on the auxiliary carrier structure, as shown, a simple shift mechanism is made possible, said mechanism utilizing a minimum number of parts of simplified construction. Applicant, however, claims as his invention all modifications falling within the scope of the appended claims.

What is claimed is:

1. A dual ratio mechanism for axle structures comprising, in combination with an axle housing having a differential carrier rotatably mounted therein and drive axles extending from said differential carrier, axially spaced bearing assemblies mounted on said carrier, an auxiliary carrier rotatably mounted on said bearing assemblies, a driven gear fixed to said auxiliary carrier, a first spur gear also fixed to said auxiliary carrier adjacent the driven gear, a second spur gear adjacent said first spur gear and journaled on the auxiliary carrier, a gear cluster including two gears in engagement with said spur gears, an axially shiftable sleeve mounted on and for rotation with the differential carrier at the side thereof at which said gears are located, a dental clutch element carried by said sleeve, a first dental clutch member formed on said auxiliary carrier adapted to be engaged by the dental clutch element on said sleeve, a second dental clutch member secured to the second spur gear, said second dental clutch member being engageable by the dental clutch elements on said sleeve, and means to move said sleeve axially of the differential carrier to engage either the first or the second dental clutch member, sufficient space being provided between said dental clutch members to provide a neutral position for said sleeve.

2. A device as set forth in claim 1 in which the second spur gear is mounted on an extension from the auxiliary carrier structure by an annular retainer member secured to the extension and overlapping said second spur gear, and said second dental clutch member overlapping said annular retainer and being rigidly secured radially outwardly beyond said annular retainer to said second spur gear.

3. A device as set forth in claim 2 in which the second spur gear is mounted on an extension from the auxiliary carrier at its side by an annular member secured to the extension and overlapping said second spur gear, said extension overhanging the bearing assembly at that side and being formed internally to provide said first dental clutch member, and said second dental clutch member overlapping said annular retainer and being rigidly secured radially outwardly beyond said annular retainer to said second spur gear.

4. A dual ratio mechanism for axle structures comprising, in combination with an axle housing, a gear housing secured to the axle housing and having spaced supporting structures extending into the axle housing, a differential carrier rotatably mounted in said supporting structures, drive axles extending from said differential carrier, spaced bearing assemblies mounted on said carrier between the supporting structures, an auxiliary carrier rotatably mounted on said bearing assemblies, a driven gear fixed to said auxiliary carrier, a first spur gear fixed to said auxiliary carrier for rotation therewith, a second spur gear adjacent said first spur gear and journaled on the auxiliary carrier, a gear cluster including two gears in engagement with said spur gears, an axially shiftable sleeve mounted on and for rotation with the differential carrier at the side thereof at which said gears are located, dental clutch elements carried by said sleeve, a first dental clutch member formed on said auxiliary carrier adapted to be engaged by said elements on said sleeve, a second dental clutch member secured to the second spur gear, said second dental clutch member being engageable by the elements on said sleeve, and means to shift said sleeve axially of the differential carrier to engage either of said dental clutch members, sufficient space being provided between said dental clutch members to provide a neutral position for said sleeve.

5. A dual ratio mechanism for axle structures comprising, in combination with an axle housing having a differential carrier rotatably mounted therein and drive axles extending from said differential carrier, an auxiliary carrier journaled on said differential carrier, a driven gear secured to said auxiliary carrier, a first spur gear also fixed to said auxiliary carrier, a second spur gear adjacent said first fixed spur gear and journaled on the auxiliary carrier, a gear cluster including two gears mounted for engagement with said spur gears, an axially shiftable sleeve mounted on and for rotation with the differential carrier at the side thereof at which said gears are located, external dental clutch elements carried by said sleeve, a first dental clutch member with internal teeth formed on said auxiliary carrier for engagement by the elements on said sleeve, a second dental clutch member with internal teeth secured to the second spur gear, said second dental clutch member being engageable by the elements on said sleeve member, and means to move said sleeve axially of the differential carrier to engage either of said dental clutch members, sufficient space being provided between said members to provide a coasting position for said sleeve.

6. A dual ratio mechanism for axle structures comprising, in combination with an axle housing having a differential carrier rotatably mounted therein and drive axles extending from said differential carrier, axially spaced bearing assemblies mounted on said carrier, an auxiliary carrier rotatably mounted on said bearing assemblies, a driven gear fixed to said auxiliary carrier, a first spur gear fixed to said driven gear, a second spur gear adjacent said first spur gear and journaled on the auxiliary carrier, a gear cluster including two gears in engagement with said spur gears, an axially shiftable sleeve mounted on and for rotation with the differential carrier at the side thereof at which said gears are located, a dental clutch element carried by said sleeve, a first dental clutch member connected to the first spur gear for rotation therewith adapted to be engaged by the dental clutch element on said sleeve, a second dental clutch member secured to the second spur gear, said second dental clutch member being engageable by the dental clutch elements on said sleeve, and means to move said sleeve axially of the differential carrier to engage either the first or the second dental clutch member, sufficient space being provided between said dental clutch members to provide a neutral position for said sleeve.

FRANK W. AVILA.

REFERENCES CITED

The following references are of record in the file of this patent:

UNITED STATES PATENTS

| Number | Name | Date |
|---|---|---|
| 2,152,771 | Ormsby | Apr. 4, 1939 |
| 2,180,962 | Ormsby | Nov. 21, 1939 |

FOREIGN PATENTS

| Number | Country | Date |
|---|---|---|
| 23,579 | Great Britain | Oct. 11, 1910 |